US005253971A

United States Patent [19]

Weinlader

[11] Patent Number: 5,253,971

[45] Date of Patent: Oct. 19, 1993

[54] WASTE MATERIAL LOADING DEVICE

[76] Inventor: J. Keith Weinlader, 337 Ludwell Dr., Lancaster, Pa. 17601

[21] Appl. No.: 864,457

[22] Filed: Apr. 6, 1992

[51] Int. Cl.[5] .............................................. B65G 65/38

[52] U.S. Cl. .................................. 414/412; 241/101.7; 241/200; 241/DIG. 38; 414/523; 414/528

[58] Field of Search ........................ 414/412, 523, 528; 241/101.7, 200, DIG. 38, 285.3

[56] References Cited

U.S. PATENT DOCUMENTS

| | | | |
|---|---|---|---|
| 2,853,240 | 9/1958 | Mahoney, Jr. | 241/DIG. 38 X |
| 3,209,803 | 10/1965 | Feterl | 241/200 |
| 4,034,920 | 7/1977 | Bradley | 241/101.7 |
| 4,067,506 | 1/1978 | Cerroni | 241/200 |
| 4,183,472 | 1/1980 | Packard et al. | 241/200 |
| 4,995,770 | 2/1991 | Crane | 414/412 |
| 5,002,453 | 3/1991 | Hale et al. | 414/412 |
| 5,007,787 | 4/1991 | Schnader | 414/412 |

FOREIGN PATENT DOCUMENTS

| | | | |
|---|---|---|---|
| 605753 | 5/1978 | U.S.S.R. | 414/412 |
| 1090622 | 5/1984 | U.S.S.R. | 414/412 |

*Primary Examiner*—David A. Bucci

*Attorney, Agent, or Firm*—Hartman Underhill & Brubaker

[57] ABSTRACT

A device for loading waste material into a refuse collection vehicle including a trough attached to a rear end of the vehicle. An inclined conveyor, having a lower end and an upper end, is disposed in the trough. An anchor is disposed at the lower end of the conveyor for holding a plastic bag containing waste material. The conveyor has slats with teeth for tearing open the plastic bag so that the waste material is emptied from the bag and then carried by the conveyor to the rear end of the vehicle. A hydraulic motor drives the conveyor, and a control bar is provided to activate and deactivate the hydraulic motor. A latch bar latches the control bar in a nondriving position wherein the hydraulic motor is deactivated.

18 Claims, 4 Drawing Sheets

WASTE MATERIAL LOADING DEVICE

FIELD OF THE INVENTION

This invention relates generally to collection of waste material and, in particular, to a device for loading waste material into a refuse collection vehicle. The device of the present invention is specifically designed to open and empty plastic bags containing grass clippings, leaves and other earthgrown waste materials as the bags are picked up at curbside and the waste material is loaded into a rear loading compactor truck.

BACKGROUND OF THE INVENTION

U.S. Pat. No. 5,002,451 granted Mar. 26, 1991 to J. K. Hale et al discloses apparatus for debagging waste material. This apparatus includes a receptacle which is pivotally attached to a refuse collection vehicle for movement between a loading position and a dumping position. A bag rupturing mechanism is disposed in the receptacle, and a bag clamping device is mounted on the receptacle. When the receptacle is in the loading position, a plastic bag containing waste material is loaded into the receptacle and the top of the plastic bag is inserted in the clamping device. As the receptacle is moved from its loading position to its dumping position, the bottom of the plastic bag is ruptured by the rupturing mechanism and the waste material is dumped into the collection vehicle.

A drawback of the apparatus disclosed in the Hale et al patent is that the movement of the receptacle between its loading and dumping positions is time consuming thereby reducing the efficiency of the apparatus. Therefore, it is an object of the present invention to provide a waste material loading device which is more efficient than the apparatus disclosed in the Hale et al patent.

SUMMARY OF THE INVENTION

The present invention provides a device for loading waste material into a refuse collection vehicle. The device comprises a trough attached to a rear end of the vehicle, and an inclined conveyor disposed in the trough. The conveyor has a rearward lower end and a forward upper end, and anchoring means is disposed at the lower end of the conveyor for anchoring a bag containing waste material. The conveyor has means for tearing open the bag so that the waste material is emptied from the bag and carried by the conveyor into the rear end of the vehicle.

The trough has a pair of sidewalls and a floor. The conveyor includes a plurality of slats connected between a pair of endless chains. The slats travel along the trough floor from the lower end to the upper end of the conveyor. The device also comprises means for driving the conveyor, and means for activating and deactivating the driving means. In the preferred embodiment of the device, the driving means includes a hydraulic motor. The activating and deactivating means includes a control bar pivotally mounted on the sidewalls of the trough. A latch bar may be provided for latching the control bar in a nondriving position wherein the hydraulic motor is deactivated.

DESCRIPTION OF THE INVENTION

Figure 1:
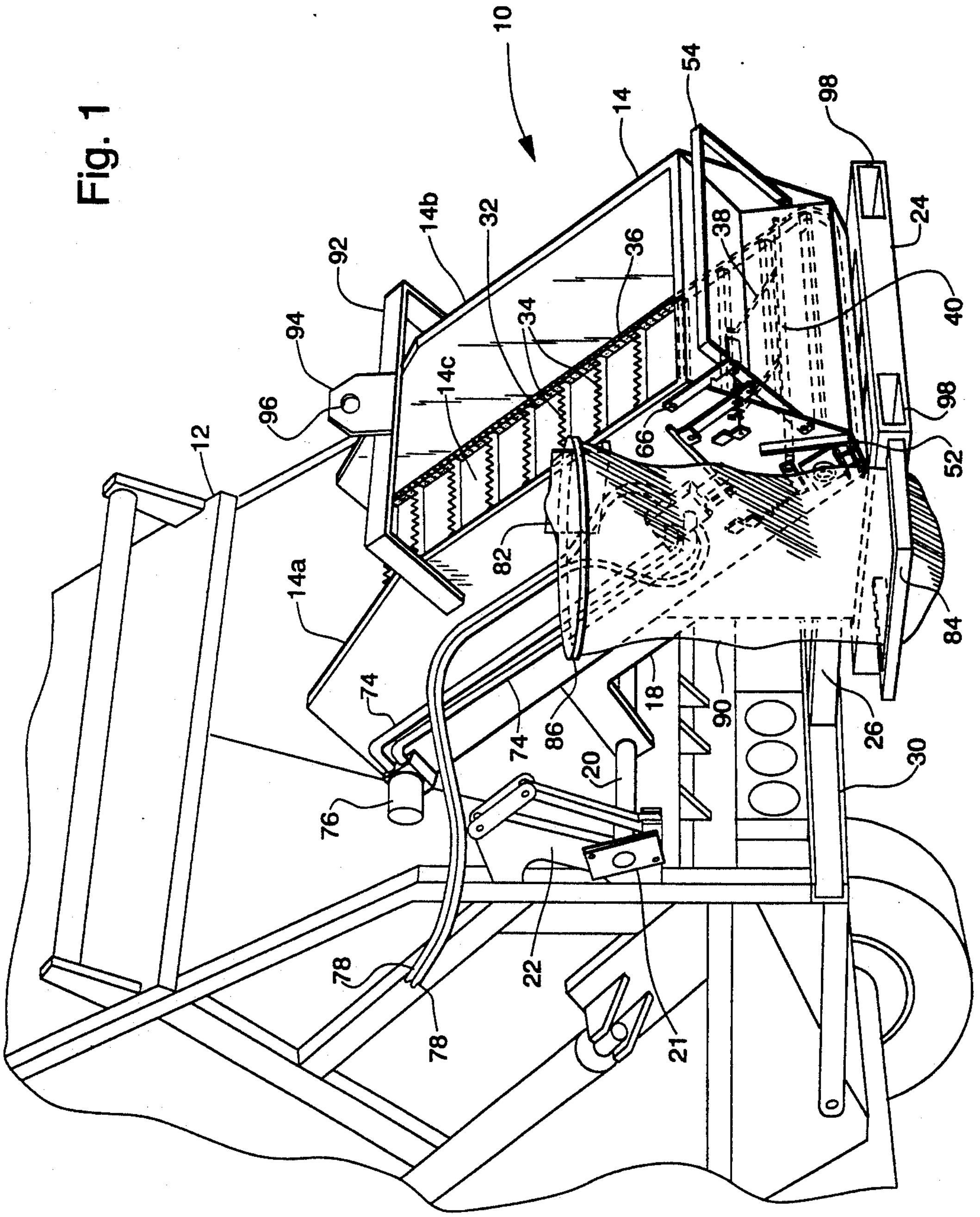
FIG. 1 is a perspective view of a waste material loading device according to the preferred embodiment of the present invention mounted on a rear end of a conventional refuse collection vehicle.
Figure 2:
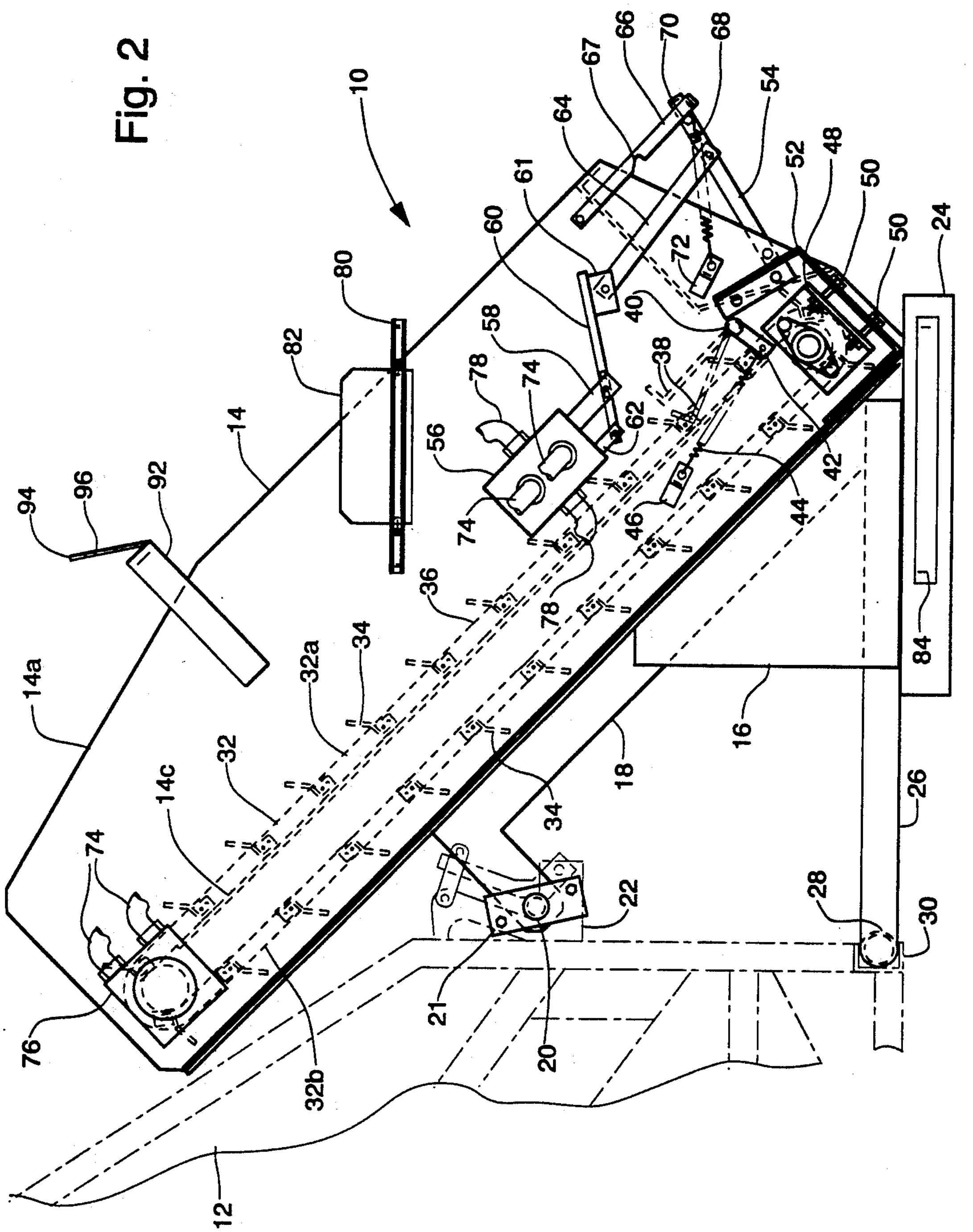
FIG. 2 is a side elevational view of the waste material loading device shown in FIG. 1.

Referring to FIG. 1 and 2, a waste material loading device 10 according to the preferred embodiment of the present invention is mounted on a rear end of a conventional refuse collection vehicle 12. The device 10 includes a trough 14 supported on a frame 16. The trough 14 has sidewalls **14*a*, 14*b* and a floor 14*c*. A pair of inclined L-shaped beams 18 that form part of the frame 16 are pivotally attached to a trundle bar 20. A pair of trundle bar supports 22 on the rear end of the Vehicle 12 receive the trundle bar 20. Plates 21 on the ends of trundle bar 20 are bolted to the trundle bar supports 22. The frame 16 also includes a platform 24 and a pair of horizontal beams 26. A tube 28 (FIG. 2) connects the beams 26 and is engaged in a C-shaped frame rail or bumper 30 on the rear end of the vehicle 12**.

A conveyor 32 disposed in the trough 14 has an upper run **32*a* and a lower run 32*b*. Conveyor 32 consists of a plurality of parallel slats 34 connected between a pair of endless chains 36. At the upper and lower ends of the conveyor 32, the chains 36 are entrained around sprockets (not shown). The conveyor upper run 32*a* travels upwardly and forwardly along the trough floor 14*c* toward the rear end of the vehicle 12. A pair of hook tines 38 (FIG. 2) are welded on a shaft 40 which is rotatably mounted in holes in the trough sidewalls 14*a*, 14*b*. Connected to one end of the shaft 40 is a lever 42. A tension spring 44 is stretched between the lever 42 and a bracket 46 which is attached to the trough sidewall 14*a*. The spring 44 serves to urge the tines 38 in a direction toward a raised phantom position shown in FIG. 2 in order to reduce contact between the slats 34 and the tines 38 when the conveyor 32** is being driven.

The sprockets (not shown) at the lower end of the conveyor 32 are supported by bearings 48. Adjustment bolts 50 extend through brackets 52 which are secured to the trough sidewalls **14*a*, 14*b*. The bolts 50 are engaged with the bearings 48 in a manner to draw the bearings 48 toward the brackets 52 and thereby take up slack in the conveyor chains 36**.

Pivotally mounted on the sidewalls **14*a*, 14*b* of the trough 14 is a U-shaped control bar 54. A hydraulic control valve 56 mounted on the trough sidewall 14*a* has a piston rod 58 pivotally connected to a lever 60 through a lost motion connection 59, FIG. 4. One end of the lever 60 is pivoted to a bracket 62 on the control valve 56 while the other end of the lever 60 carries a tab 61 pivoted to a link 64. The link 64 is pivotally connected between the control bar 54 and the lever 60. A latch bar 66 pivoted on the trough sidewall 14a is urged by a spring 68 into engagement with a latch pin 70 on the control bar 54. The spring 68 is anchored to a bracket 72 on the trough sidewall 14*a***.

Hoses 74 are connected between the control valve 56 and a hydraulic motor 76. Other hoses 78 are connected to a hydraulic system on the vehicle 12. The hydraulic motor 76 is arranged to drive the conveyor 32 by rotating the sprockets (not shown) at the upper end of the conveyor 32.

Figure 5:
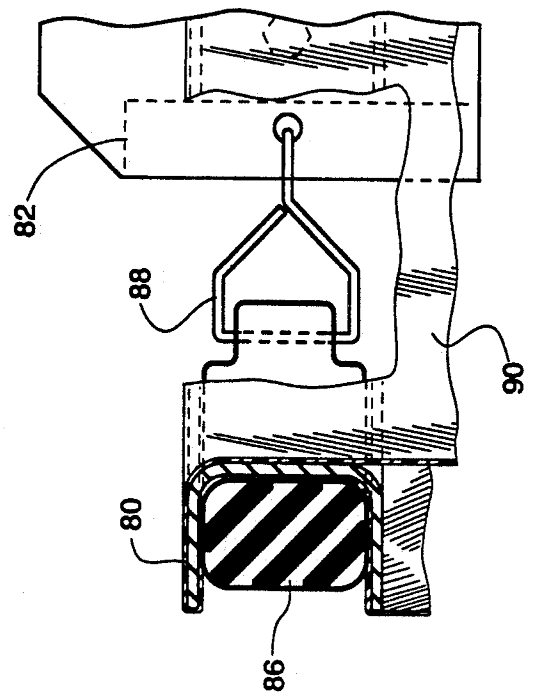
FIG. 5 is an enlarged view, partly in section, of a feature of the waste material loading device shown in FIG. 2.

A bag supporting ring 80 is carried by a plate 82 on the trough sidewall 14a, and a bag retaining enclosure 84 is carried on the platform 24. As seen in FIG. 5, the ring 80 has a substantially C-shaped cross-section. An elastic band 86 is disposed in the ring 80. One end of the band 86 is anchored to the plate 82 while the other end of the band 86 is releasably connected to the plate 82 by a hook device 88. A plastic bag 90 has its upper end clamped to the ring 80 by the band 86, and the lower end of the bag 90 is disposed in the enclosure 84.

A substantially U-shaped bar 92 is attached to the sidewalls 14a, 14b of the trough 14. Welded to the bar 92 is a plate 94 with a hole 96 formed therein. The bar 92 may be utilized to lift the trough 14 with a hoist so that the trough 14 may be fastened to the frame 16. Slots 98 in the platform 24 receive forks (not shown) on a fork lift when it is desired to lift the device 10 into a position for mounting on the rear end of the vehicle 12.

Figure 3:
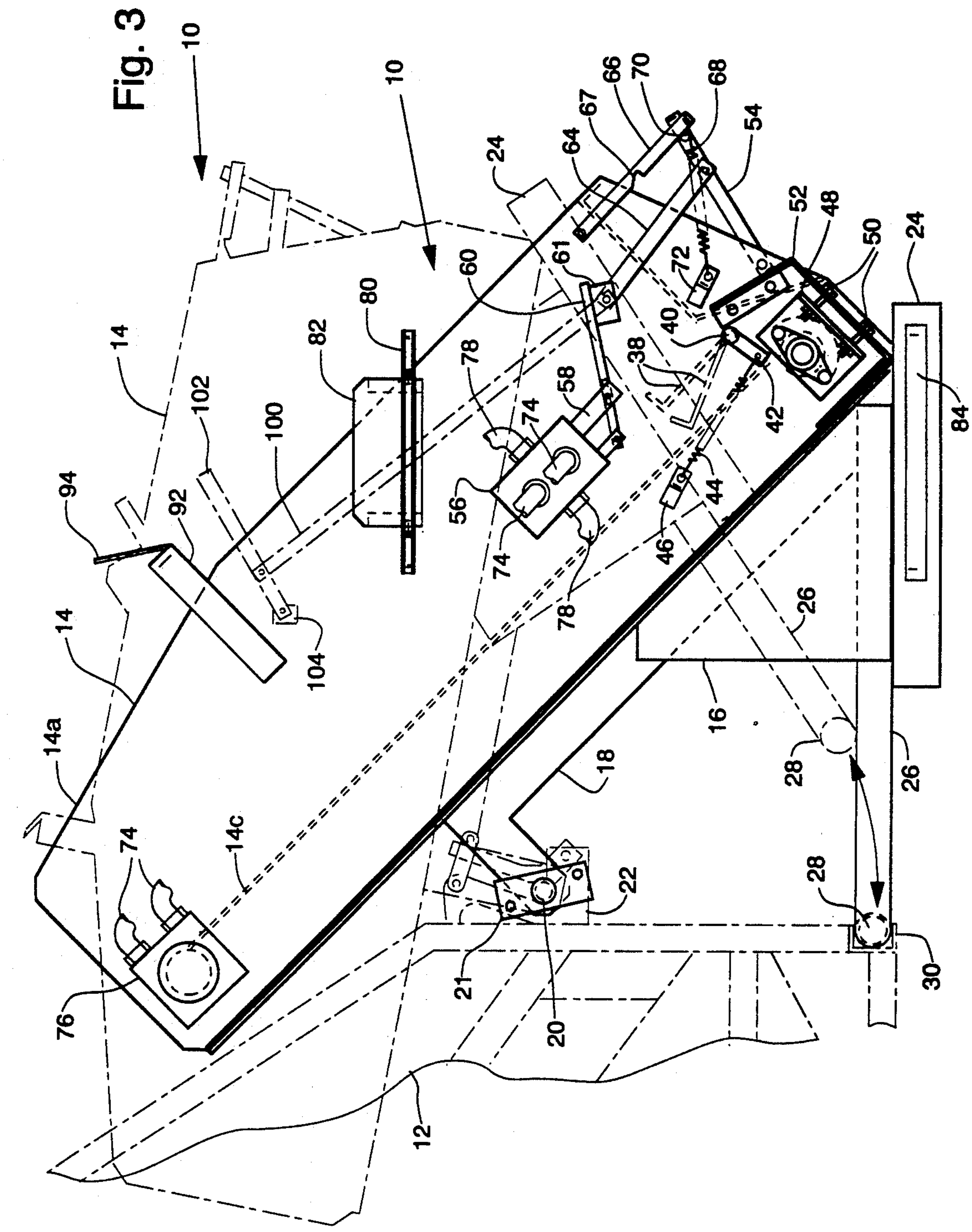
FIG. 3 is a side elevational view of a waste material loading device illustrating a further embodiment of the present invention.

An important feature of the waste material collection device 10 is illustrated in FIG. 3. With the device mounted on the rear end of the vehicle 12, the pivotal mounting of the frame 16 on the trundle bar 20 permits the device 10 to move from the solid line position toward the dashed line position if the vehicle 12 crosses a low spot or a dip in a road and the platform 24 contacts the road surface. This movement of the device 10 prevents structural damage to the device 10 when operating the vehicle 12 on uneven road surfaces. It will be understood that the force of gravity will move device 10 back from the dashed line position toward the solid line position.

When it is desired to operate the device 10 for loading waste material into the collection vehicle 12, latch bar 66 is lifted to insure disengagement of a notch 67 formed therein and pin 70 on control bar 54. Then the control bar 54 is moved rearwardly (i.e. away from the rear end of the vehicle 12) which causes the lever 60 to pivot on the bracket 62 due to the link 64. The pivoting of the lever 60 causes the piston rod 58 to extend from the control valve 56 thereby opening fluid flow between the hoses 74 and 78. This open fluid flow activates the hydraulic motor 76 which drives the conveyor 32 by rotating the sprockets at the upper end of the conveyor 32. The upper run 32a of the conveyor 32 travels upwardly and forwardly along the floor 14c of the trough 14. Preferably, the conveyor has a speed in the range of 100 to 120 feet per minute.

With the conveyor 32 being driven by the hydraulic motor 76, a person places a plastic bag containing waste material in the trough 14 on the lower end of the conveyor 32 so that the bag becomes anchored on hook tines 38. The person holds onto the top of the plastic bag which will be a foot or more above the upper surface 32a of the conveyor. Teeth formed on the slats 34 tear open the bottom of the plastic bag. Then the slats 34 carry released waste material upwardly for discharge into the rear end of vehicle 12. The empty plastic bag is lifted out of the trough 14 by the operator and deposited in the bag 90 for subsequent recycling.

The conveyor 32 is stopped by moving control bar 54 forwardly (i.e. toward the rear end of the vehicle 12) until the pin 70 on the control bar 54 is engaged in the notch 67 in the latch bar 66. The latch bar 66 latches the control bar 54 in a nondriving or "off" position thereby preventing inadvertent driving of the conveyor 32. The forward movement of the control bar 54 results in the piston rod 58 being retracted into the control valve 56. Fluid flow between the hoses 74 and 78 is shut off and the hydraulic motor 76 is deactivated thereby stopping the conveyor 32.

Figure 4:
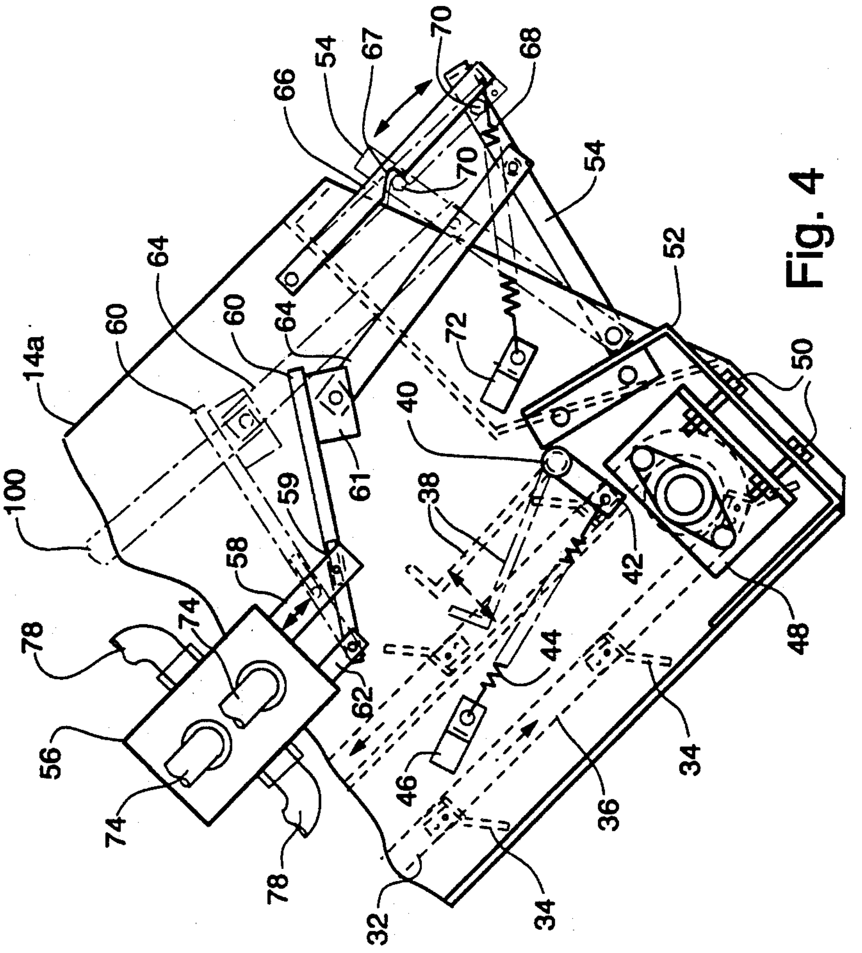
FIG. 4 is an enlarged side elevational view of a portion of the waste material loading device shown in FIGS. 2 and 3.

In a further embodiment of the device 10 shown in FIGS. 3 and 4, another link 100 is pivotally connected at one end to the tab 61 on the lever 60. The other end of the link 100 is pivotally connected to another control bar 102 which is pivoted on brackets 104 mounted on the sidewalls 14a, 14b of the trough 14. The control bars 54, 102 may be used alternatively to activate and deactivate the hydraulic motor 76.

It will be understood that generally a plastic bag containing heavy material such as grass clippings will be opened easier by the device 10 than a plastic bag containing light material such as leaves.

What is claimed is:

1. A device for loading waste material into a refuse collection vehicle, said device comprising:
- a trough attached to a rear end of the refuse collection vehicle;
- an inclined conveyor disposed in said trough, said conveyor having a lower end and an upper end;
- anchoring means disposed at the lower end of said conveyor for anchoring a bag containing waste material; and
- means on said conveyor for tearing open said bag so that the waste material is emptied from the bag and carried by said conveyor into the rear end of the refuse collection vehicle.

2. The device of claim 1, wherein said trough has a pair of sidewalls and a floor.

3. The device of claim 2, wherein said conveyor includes a plurality of slats connected between a pair of endless chains, and wherein said slats travel along said trough floor from the lower end to the upper end of said conveyor.

4. The device of claim 3, further comprising means for driving said conveyor.

5. The device of claim 4, further comprising means for activating and deactivating said driving means.

6. The device of claim 5, wherein said driving means comprises a hydraulic motor, and wherein said activating and deactivating means comprises a control bar pivotally mounted on the sidewalls of said trough.

7. The device of claim 6, further comprising a latch bar for latching said control bar in a nondriving position wherein said hydraulic motor is deactivated.

8. The device of claim 7, further comprising a control valve for controlling fluid flow to said hydraulic motor.

9. The device of claim 8, wherein said anchoring means comprises a pair of tines pivotally mounted on said trough.

10. The device of claim 9, further comprising spring means for urging said tines in a direction to reduce contact between the conveyor slats and said tines.

11. The device of claim 1, further comprising a frame for supporting said trough, and a trundle bar attached to said frame for pivotally mounting said frame on the rear end of the refuse collection vehicle.

12. The device of claim 3, wherein said tearing means comprises teeth on said slats.

13. The device of claim 6, wherein said activating and deactivating means comprises another control bar pivotally mounted on the sidewalls of said trough.

14. The device of claim 7, wherein said latch bar has a notch formed preview for engagement with a pin on said control bar for latching said control bar in said nondriving position.

15. The device of claim 14, further comprising spring means connected to said latch bar for urging said notch into engagement with said pin.

16. The device of claim 8, wherein said control valve has a piston rod connected to said control bar so that said piston rod is extended and retracted in response to pivoting movement of said control bar in order to open and close fluid flow to said hydraulic motor.

17. The device of claim 16, further comprising a lever connected to said piston rod, and a link connecting said lever to said control bar.

18. The device of claim 9, wherein said pair of tines are mounted on a shaft which extends between and is rotatably mounted in the sidewalls of said trough.

* * * * *